United States Patent [19]
Ewertz

[11] 3,947,075
[45] Mar. 30, 1976

[54] BEARING SYSTEM
[75] Inventor: Hans P. Ewertz, Granada Hills, Calif.
[73] Assignee: Valley-Todeco, Inc., Sylmar, Calif.
[22] Filed: Nov. 4, 1974
[21] Appl. No.: 520,274

[52] U.S. Cl. .................................. 308/72; 72/402
[51] Int. Cl.² ........................................ F46C 23/04
[58] Field of Search ......... 308/15, 72, 177, 22, 236; 72/402, 403, 406

[56] References Cited
UNITED STATES PATENTS

| 3,383,129 | 5/1968 | Uljerup | 308/72 |
|---|---|---|---|
| 3,401,964 | 9/1968 | Johnson | 308/72 |
| 3,482,890 | 12/1969 | Burrell | 308/72 |
| 3,697,145 | 10/1972 | Day, Jr. | 308/72 |

Primary Examiner—M. H. Wood, Jr.
Assistant Examiner—Richard A. Bertsch
Attorney, Agent, or Firm—Harvey C. Nienow

[57] ABSTRACT

A bearing system, for joint or hinge point bearings, employing a spherical bearing wherein the ball member is provided with oppositely disposed flat side walls and the bearing race therefore is formed with a longitudinal slot whereby the ball member can be inserted into the race. A sleeve, which is secured to a supporting or operating member during installation, is provided about the race and the sleeve and race are formed with mating splines which enable the spherical bearing assembly to reciprocatably move relative to the sleeve.

Suitable lubricating channels are provided, and sealing rings are installed at the outer margins of the bearing ball and race members to retain the lubricant in place and to prevent the ingress of foreign material.

9 Claims, 6 Drawing Figures 3,947,075

BEARING SYSTEM

The present invention relates generally to bearing systems, and more particularly to such systems as employ spherical bearings.

To provide more effective joint or hinge point bearings, there has been provided spherical bearings which comprise a generally spherical ball member which moves within a complementally formed bearing race. Thus, by attaching the ball member and race separately and independently to structural or operating members, there is afforded effective unlimited angular displacement movement between such members.

In the making or manufacturing of such spherical bearings, the ball member is formed of relatively hard material, and thereafter the race is swaged or formed under force to be complemental in shape to the ball member. However, such spherical bearings are unsatisfactory for many applications since the swaging or cold-forming of the race precludes such race from being formed of strong, tough, wearable material.

To enable each of the members of such a spherical bearing to be made separately of separate and independent material, and to be annealed or hardened in its own separate process, slotted spherical bearings were devised. This form of bearing utilizes a ball member which is formed with a pair of flat opposite side walls, and a race member which is formed generally complementally of said ball member and which has a slot to enable such ball member to be inserted and removed from the bearing race. Typically, such ball member is inserted generally axially into the race and thereafter is twisted or turned 90° to be in its proper mating and bearing position with respect to the race. Such turning also causes the bearing ball to be retained within the bearing race during operating conditions.

A weakness of such slotted entry spherical bearings, particularly in certain applications within contaminating environments, has become evident within recent years. Such weakness is that the bearing surfaces are so exposed that it is difficult to retain lubricant thereon and to prevent the ingress of foreign material which might scar or mar the bearing surfaces. Also, for certain applications, as for instance where such bearing members are used between large aircraft landing gear struts or supports where complicated movements are required between certain structural members, such bearing members have been somewhat unyielding in accommodating all combinations of structural flexure caused by varying loads and buildup of manufacturing tolerances.

In view of the foregoing, it is an object of the present invention to provide a bearing system which permits complicated relative motions between structural members secured to the bearing system without causing undue internal stresses within the bearing system.

Another object of the present invention is to provide a bearing system as characterized above which is adapted to retain lubricants and to prevent the ingress of foreign materials.

Another object of the present invention is to provide a bearing system as characterized above having a pair of bearing members for attachment individually to separate structural members, but wherein one of the bearing members is connected to its structural member to permit reciprocatory movement therebetween.

A further object of the present invention is to provide a bearing system as characterized above wherein a slotted entry or other spherical bearing is mounted relative to a sleeve, there being means for permitting reciprocatory relative movement therebetween.

Another object of the present invention is to provide a bearing system as characterized above wherein the bearing surfaces are lubricated jointly with lubrication of the means affording reciprocatory movement between such bearing and fixed sleeve.

An even further object of the present invention is to provide a bearing system as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
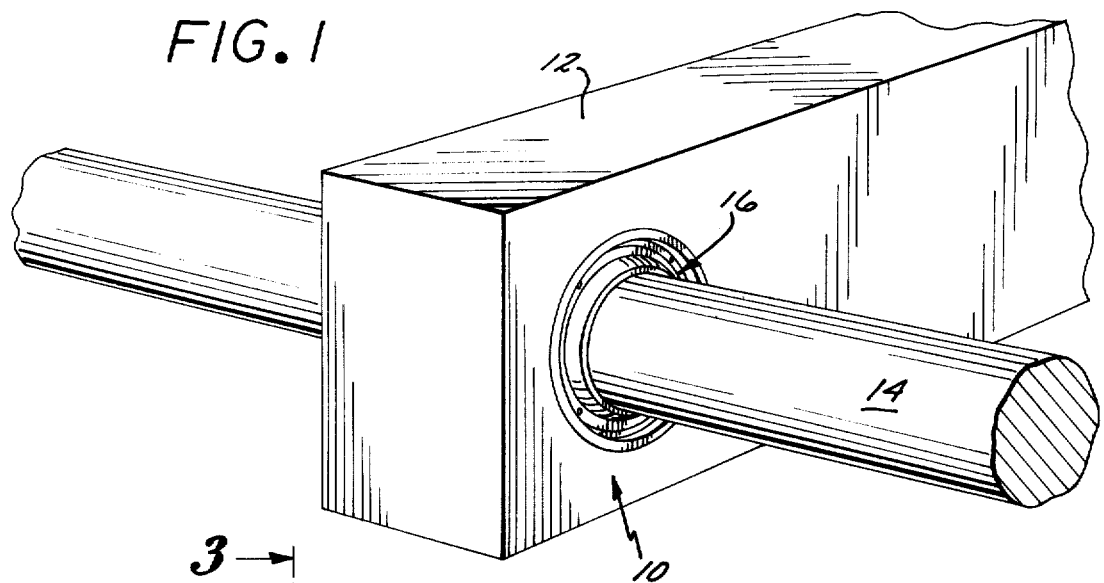
FIG. 1 is a fragmentary perspective view of a subject bearing system connected to certain structural members.
Figure 2:
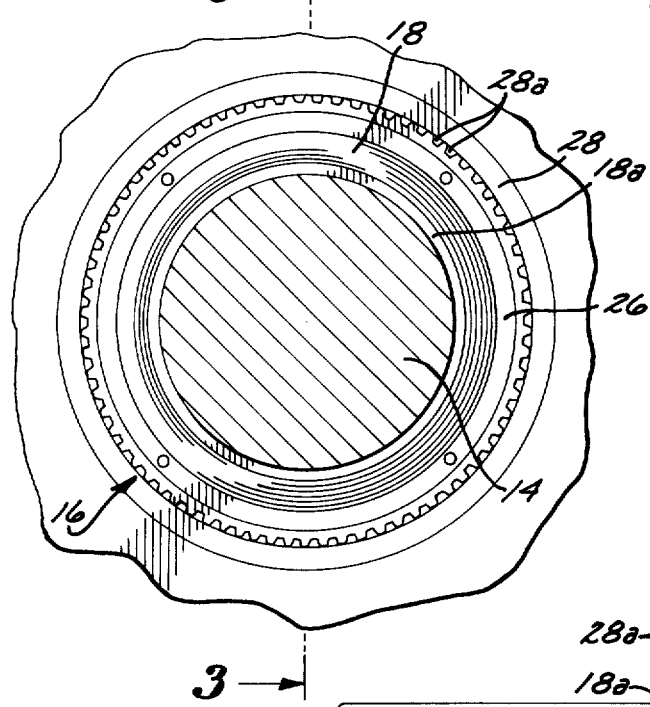
FIG. 2 is a fragmentary side elevational view of the bearing system of FIG. 1.

Referring to FIG. 1 of the drawings, there is shown therein a bearing system 10 according to the present invention, in association with structural members 12 and 14. Although these structural members are merely illustrative of levers, arms or rods to which the subject bearing system could be connected, the present invention has particular utility in the aircraft industry. It has been found that certain structural members in the landing gear mechanisms of relatively large aircraft must go through very specific and complicated movements to enable the landing gear to be lowered and retracted whenever necessary. Such aircraft mechanisms are often somewhat inaccessible, and therefore reliance or dependability of the bearing members or systems is essential if not mandatory.

Notwithstanding, the strong applicability of the subject bearing systems to the aircraft industry, it is realized that such systems can be employed with respect to the joints or pivot points of any relatively moveable system of levers or other structural members associated with or a part of any other device or apparatus. Thus, the structural members 12 and 14 are merely representative of that widely varying group of structural members.

Figure 3:
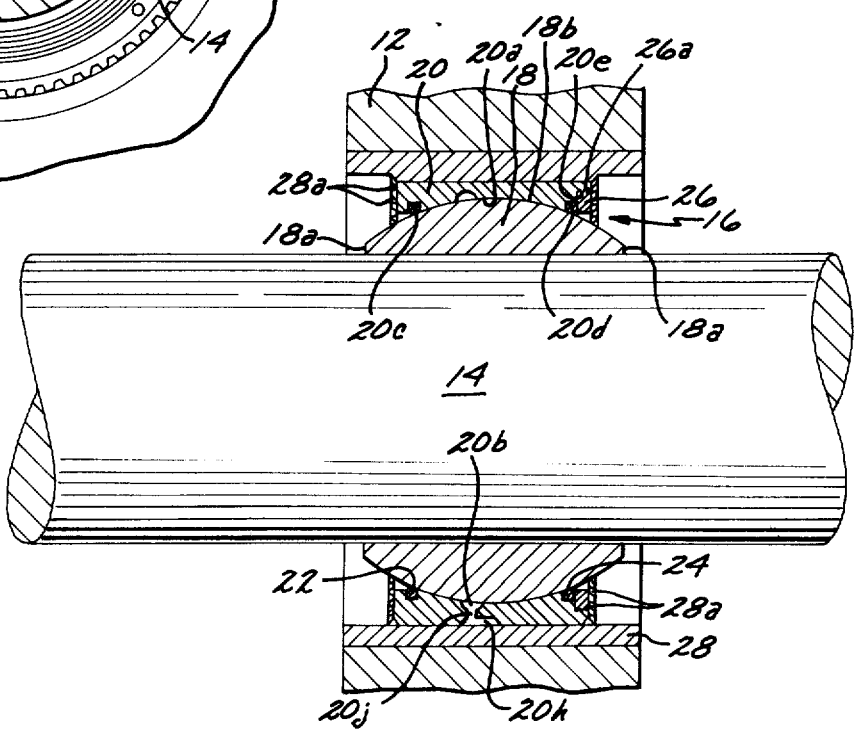
FIG. 3 is a fragmentary sectional view of the bearing system, taken substantially along lines 3—3 of FIG. 2.
Figure 4:
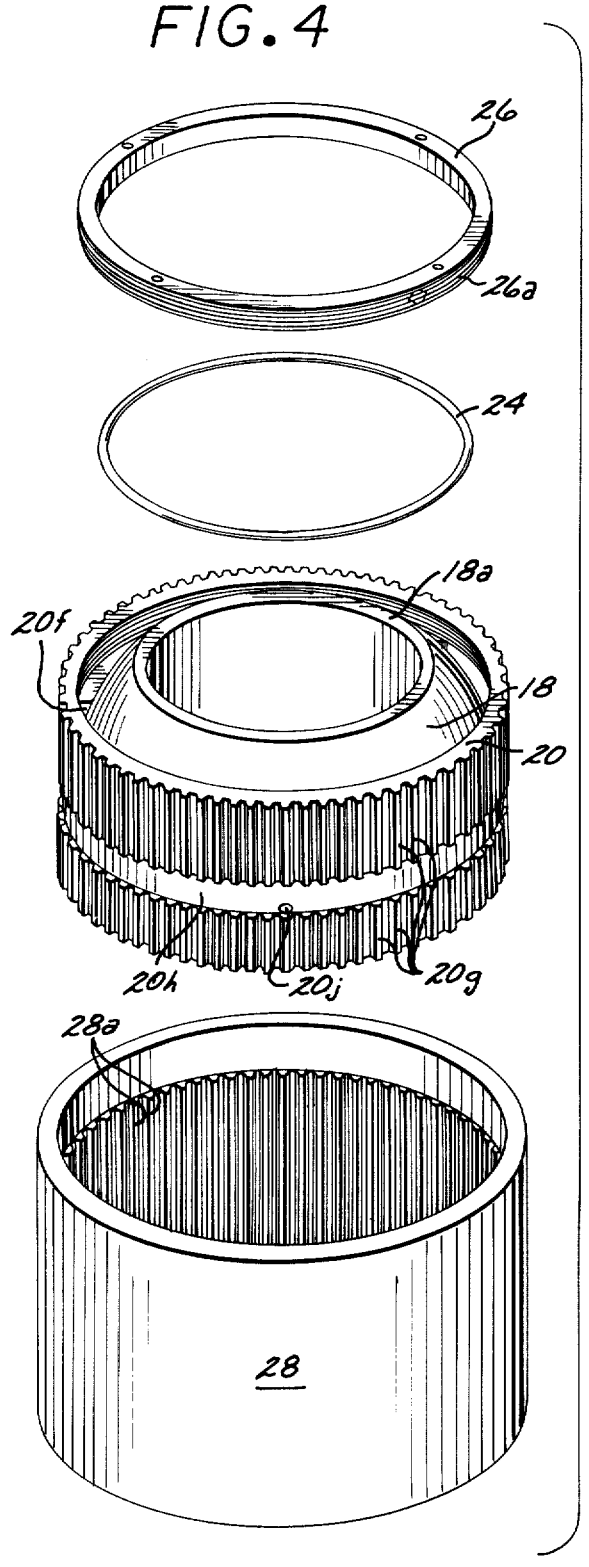
FIG. 4 is an exploded perspective view of the bearing system of FIG. 1.
Figure 5:
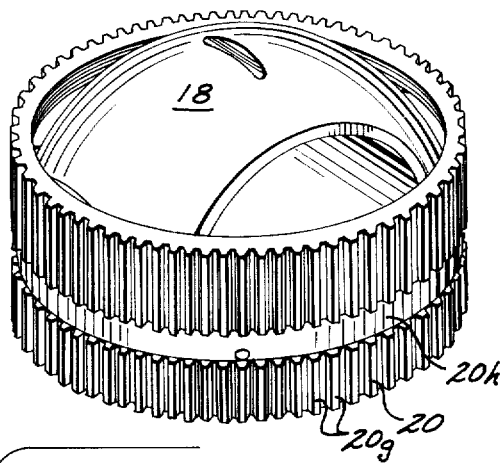
FIG. 5 is a perspective view of the spherical bearing during assembly.

Referring more particularly to FIGS. 3, 4 and 5 of the drawings, the subject bearing system 10 comprises a spherical bearing assembly 16 which has a bearing ball member 18 and a bearing race 20. The ball 18 is generally spherical in its outer surface, and is provided with a pair of relatively flat, parallel side walls 18a joined by a spherical surface 18b.

Such sphere or ball 18 may be formed of any appropriate material and is usually relatively hard for purposes of long life and proper operation. However, ball 18 should not be as hard or resistant to wear as race 20 to insure that the ball assumes most of the wear.

Such spherical bearing assembly 16 has its bearing race 20 formed with a spherical surface 20a which is complemental to the surface 18b of ball 18. Race 20 is further formed with lubricating paths or channels 20b which extend about the circumference of the race 20 and which conduct lubricant to the bearing surfaces of ball 18 and race 20 as will hereinafter become more apparent.

Race 20 is further formed with an annular U-shaped cut-out or groove wherein an O-ring 22 is positioned for engagement with the bearing surface 18b of ball 18. Such O-ring 22 may be formed of any appropriate generally resilient material such as rubber, plastic or the like. The purpose of such O-ring is to effectively seal one side of the bearing assembly 16, between the bearing surfaces 18b and 20a.

Race 20 is preferably formed from materials and manufacturing processes that result in the load bearing surface 20a of race 20 being more resistant to wear than the mating bearing surface of ball 18.

Bearing race 20 is also formed with an annular L-shaped groove or cut-out 20d wherein an O-ring 24 is positioned. To retain O-ring 24 in operating position between race 20 and ball 18, a retaining ring 26 is provided having external fastening threads 26a which mate with fastening threads 20e formed in bearing race 20.

Figure 6:
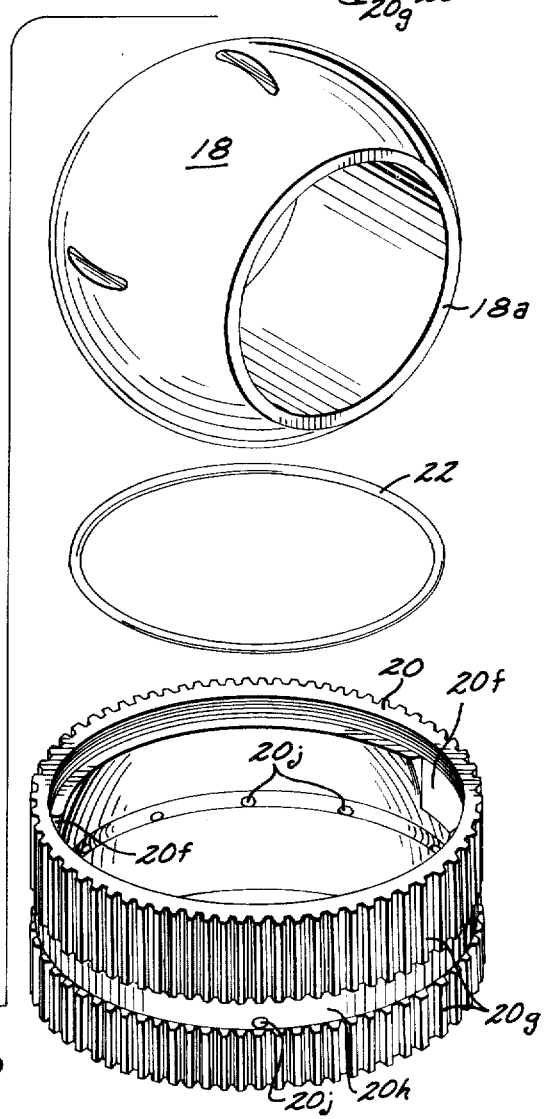
FIG. 6 is an exploded perspective view of members of the spherical bearings.

Referring most particularly to FIG. 6 of the drawings, the bearing race 20 is further formed with a pair of slots 20f which are formed diametrically opposite each other and of a width to accommodate the width of ball 18. That is, as shown in FIG. 5, the slots 20f must be so positioned as to permit the bearing member 18 to pass into or out of one side of the bearing race 20.

To assemble the slotted bearing 16, it is merely necessary to firstly insert the O-ring 22 in the slot or annular groove 20c of bearing race 20, and thereafter to insert the ball 18 into the race 20 through the slot 20f as shown more graphically in FIG. 5 of the drawings. Once such ball 18 is so inserted, it is rotated 90° from the position of FIG. 5 to the position of FIGS. 3 or 4.

Thereafter, the O-ring is positioned in the groove 20d and the retaining ring 26 is threaded into the race 20 so as to urge the O-ring 24 into engagement with the ball 18.

A cylindrical sleeve 28 is positioned about the bearing race 20, and is adapted to be fastened to any appropriate structural member as by interference fit, staking, welding, or other appropriate means. Interposed between sleeve 28 and bearing race 20 is reciprocatory movement means in the form of splines 20g formed on the outer cylindrical surface of bearing race 20 and corresponding splines 28a formed on the internal cylindrical surface of sleeve 28. The interaction of the splines 20g and 28a enables the entire bearing assembly 16 to move reciprocatorily within sleeve 28 to accommodate any slight and unusual movement between the structural members 12 and 14. Also, the splines permit the race 20 to be rotationally oriented, as desired, relative to sleeve 28 and hence structural member 12 so that the slots 20f can be positioned along the axis of minimum load and wear, permitting optimum effective use of the slotted bearing system.

It is further contemplated within the purview of the present invention that the splines could be formed on the internal cylindrical surface of ball member 18 and the external surface of structural member 14 rather than between race member 20 and sleeve 28. Thus, the reciprocatory movement would be between ball member 18 and structural member 14, but the same advantages would result as above explained.

A lubricating groove 20h is formed about the entire periphery of bearing race 20 to afford lubricant to the splines through an opening 20j. Thus, with the sleeve 28 welded, staked, or otherwise secured to a structural member as shown in FIG. 1 of the drawings, and with another structural member 14 fixed to bearing member 18 within the centrally located opening thereof, the members 12 and 14 can have relative movement as afforded by such bearing assembly 16. In the event that there is some axial misalignment of the structural members, the entire spherical bearing assembly 16 is permitted to slide within the sleeve 28 to accommodate such misalignment. As such, certain stresses are prevented from occurring in the structural members or at bearing surface 20a and the relative movement therebetween is smooth and unhampered.

It is thus seen that the present invention provides a bearing system which employs a spherical bearing and wherein means is provided for enabling special movements of the parts to occur. Also, proper lubrication is afforded to the various parts of the spherical bearings as well as the reciprocatory means and sealing means is provided for retaining the lubricant within the bearing and for preventing the ingress of foreign materials.

Although I have shown and described certain specific embodiments of my invention, I am well aware that many modifications thereof are possible.

I claim:

1. A bearing system comprising in combination,
    a spherical bearing having a ball member formed with a pair of oppositely disposed substantially flat side walls and a race member formed complementally of said ball member and having a slot for receiving the same,
    the width of said ball member as defined by said opposite side walls corresponds to the slot in said race member to enable said ball member to pass through said slot for insertion and removal of said bearing member relative to said race member,
    each of said bearing members having adapted for connection to a separate structural member to cause said bearing to afford pivotal movement between said structural members,
    and means interposed between one of said bearing members and its corresponding structural member to permit reciprocatory movement therebetween for varying the point of pivotal movement between said structural members.

2. A bearing system according to claim 1 wherein said means comprises inter-engaging splines on said one of said bearing members and said corresponding structural member for preventing rotational relative movement therebetween.

3. A bearing system according to claim 2 wherein said means further includes lubricant retainer for maintaining said splines lubricated.

4. A bearing system according to claim 3 wherein said retainer comprises an elongated cut-out in the splines on said sleeve.

5. A bearing system according to claim 1 wherein said one of said bearing members and its corresponding structural member are each formed with a generally cylindrical surface whereon said splines are formed for engagement to prevent rotation but afford reciprocatory movement between said one bearing member and its corresponding structural member.

6. A bearing system according to claim 1 wherein said spherical bearing further includes a pair of sealing rings on said race member on opposite sides of said ball member to effectively isolate the bearing surfaces of said ball and race members from ingress of foreign material.

7. A bearing system according to claim 6 wherein said spherical bearing also comprises a retaining ring removably fixed to said race member for urging said sealing rings into sealing engagement with said bearing surfaces.

8. A bearing system according to claim 7 wherein the bearing surface of said ball member is external and spherical and the bearing surface of said race member is internal and complemental to the bearing surface of said ball member.

9. A bearing system according to claim 1 wherein said means comprises a sleeve about said race member and firmly secured to its corresponding structural member and mating splines formed on the exterior of said race member and the interior of said sleeve to afford said reciprocatory movement between said structural members.

* * * * *